(12) United States Patent
Chan et al.

(10) Patent No.: US 8,138,714 B1
(45) Date of Patent: Mar. 20, 2012

(54) PORTABLE HYBRID MULTI-INPUT REMOTE AA BATTERY CHARGERS

(75) Inventors: Yuk Chan, Middletown, DE (US); Arek Suszko, Rincon, PR (US); Richard Scarinzi, Toms River, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 432 days.

(21) Appl. No.: 12/462,939

(22) Filed: Aug. 6, 2009

(51) Int. Cl.
*H01M 10/44* (2006.01)
*H01M 10/46* (2006.01)

(52) U.S. Cl. ........................................ 320/103

(58) Field of Classification Search ................. 320/103, 320/106, 107, 111, 112, 138; 429/96, 97, 429/98, 99, 100; D13/103, 107, 108; 307/150
See application file for complete search history.

(56) References Cited

U.S. PATENT DOCUMENTS

| 7,375,494 | B2* | 5/2008 | Daniel et al. | 320/112 |
| 7,632,581 | B2* | 12/2009 | Wu et al. | 429/1 |
| 8,058,840 | B2* | 11/2011 | Daniel et al. | 320/112 |
| 2006/0267544 | A1* | 11/2006 | Montvay et al. | 320/106 |
| 2008/0286642 | A1* | 11/2008 | Naito et al. | 429/100 |

* cited by examiner

*Primary Examiner* — Edward Tso

(74) *Attorney, Agent, or Firm* — Michael Zelenka; Stephen J. Harbulak

(57) ABSTRACT

A portable hybrid multi-input remote AA battery charger is provided that can recharge as many as four (4) AA batteries at once within 100 minutes. This invention's battery charger for rechargeable batteries can also be powered by a number of the currently available military batteries such as the BA-8180, BA-8140, BA-5590, BA-5390, BB-390, BB-2590, and SP4 batteries. The portable hybrid multi-input remote AA battery charger includes a battery chamber, slots for the AA batteries, a charging circuit, a housing, and a pair of power source connectors. A portable hybrid multi-input remote AA battery charger apparatus and a method for charging AA rechargeable batteries with a portable hybrid multi-input remote AA battery charger are also provided.

17 Claims, 4 Drawing Sheets

PORTABLE HYBRID MULTI-INPUT REMOTE AA BATTERY CHARGERS

GOVERNMENT INTEREST

The invention described herein may be manufactured, used, imported, sold, and licensed by or for the Government of the United States of America without the payment to us of any royalty thereon.

FIELD OF THE INVENTION

The present invention relates generally to the field of battery charging devices and apparatus. More particularly, the present invention relates to a portable hybrid multi-input remote AA battery charger.

BACKGROUND OF THE INVENTION

Each year millions of dollars are spent on rechargeable batteries for use in portable electronics equipment. Due to their low life-cycle costs, rechargeable batteries are the power source of choice for numerous equipment applications, both civilian and military. There is currently no convenient and cost-effective way for recharging such batteries for remote military tactical maneuvers because currently available battery chargers are not generally portable and require other power sources, such a generator or military vehicle, connectors, and so on that would usually be available at a typical military installation, but would not be available during tactical field operations in a remote, dangerous and hostile location. Because of the unavailability of battery charging equipment in remote, dangerous, and hostile locations, our military forces typically do not take full advantage of the battery energy that would be available from a recharged battery. This practice results in the waste of millions of dollars in battery life or energy every year, and aids in the degradation of rechargeable batteries.

Not only does the military user refrain from recharging the battery because of field conditions, they tend to carry multiple spare batteries to ensure that their communications and other equipment are constantly available. Although redundant spare batteries by themselves are not excessively heavy, carrying redundant spare batteries on field maneuvers along with other required equipment can create a difficult weight problem for the individual soldier in the field with a fully loaded back-pack. In those cases, the extra weight could make the soldier susceptible to fatigue and have a detrimental impact on his survivability in remote, dangerous, and hostile locations. Another undesirable result form carrying redundant spare batteries is that the soldier may choose to omit other equipment from the fully-loaded backpack, and depending upon what equipment is left behind, such an omission might have a disastrous impact on the mission, and more importantly, his survivability.

Similarly, the non-military battery user can often be in remote, dangerous, and hostile locations where the ability to charge a rechargeable battery could increase both comfort and survivability. For example, a recreational camper or boater might be lost or stranded with inoperable battery-operated communications equipment suffering from a low state of charge due to the absence of a portable battery charger for a remote location.

Thus there has been a long-felt need for a portable battery charger that will allow the soldier or recreational camper to have portable battery recharging capacity in remote, dangerous, and hostile locations that alleviates the shortcomings, limitations, and disadvantages of currently available battery charging techniques.

SUMMARY OF THE INVENTION

In order to satisfy the long-felt need for a portable battery charger that will allow the soldier or recreational user to have portable battery recharging capability in remote, dangerous, and hostile locations without the shortcomings, limitations, and disadvantages of currently available battery charging equipment, the present invention provides a portable electrochemical charger for rechargeable AA batteries. This invention's portable hybrid multi-input remote AA battery charger can recharge as many as four (4) AA batteries at once within 100 minutes. This invention's battery charger for rechargeable batteries can also be powered by a number of the currently available military batteries such as the BA-8180, BA-8140, BA-5590, BA-5390, BB-390, BB-2590, and SP4 batteries.

It is an object of the present invention to provide a portable electrochemical charger for rechargeable AA batteries.

Another object of the present invention is to provide a portable multi-input charger for rechargeable AA batteries.

It is still another object of the present invention to provide to provide a portable hybrid multi-input remote AA charger for rechargeable AA batteries.

It is yet another object of the present invention to provide a method for charging AA rechargeable batteries with a portable hybrid multi-input remote AA battery charger.

These and other objects are advantageously accomplished with this invention's portable hybrid multi-input remote AA battery charger, which comprises a battery chamber, slots for the AA batteries, a charging circuit, a housing, and a pair of female and male connectors. In accordance with this invention, the remotely located user can now recharge as many as four (4) AA batteries at one time within 100 minutes. Other embodiments of this invention provide a portable hybrid multi-input remote AA battery charger apparatus and a method for charging AA rechargeable batteries with a portable hybrid multi-input remote AA battery charger.

DETAILED DESCRIPTION OF THE DRAWINGS

This invention's portable hybrid multi-input remote AA battery charger provides an innovative charging application for the military BB-2950 battery and other AA batteries and, in particular, to rechargeable nickel metal hydride AA batteries. The increased use of the rechargeable nickel metal hydride AA batteries in military communications and other applications makes this invention's portable hybrid multi-input remote AA battery charger particularly useful for those applications without suffering from the disadvantages, shortcomings, and limitations of prior art battery chargers. This invention can be used by soldiers in the field or others operating electrical equipment in remote locations such as recreational campers or boaters. This invention's portable hybrid multi-input remote AA battery charger can also be powered with numerous different military portable power sources such as the BA-8180, BA-8140, BA-5590, BA-5390, BB-390, BB-2590, and SP4 batteries.

Figure 1:
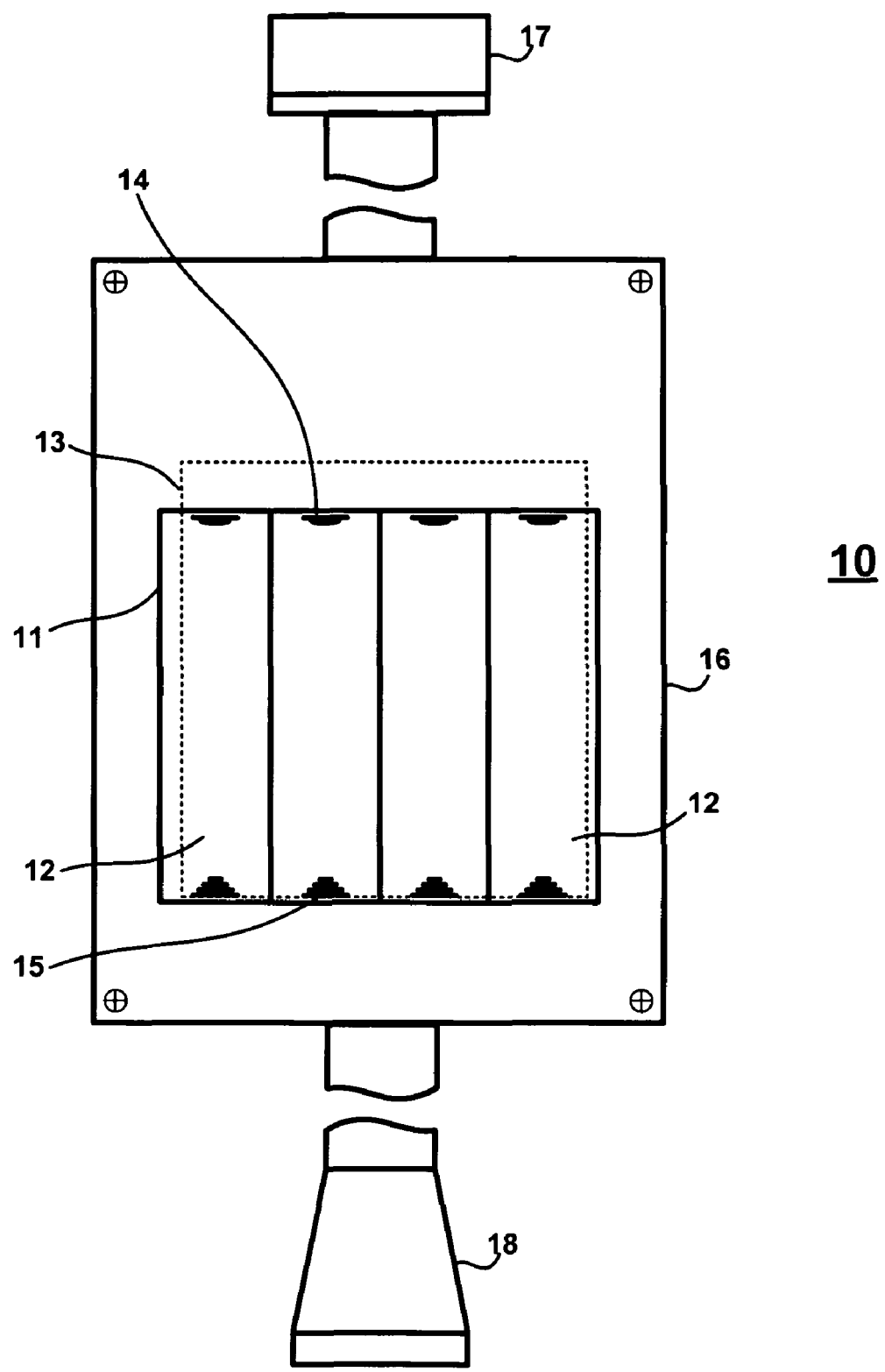
FIG. 1 is a top breakaway view of this invention's portable hybrid multi-input remote AA battery charger.

Referring now to FIG. 1, there is depicted a top breakaway view of this invention's portable hybrid multi-input remote AA battery charger 10, comprising a battery chamber 11, slots 12 for the AA batteries, and a charging circuit represented by a broken line rectangle 13 positioned underneath the battery chamber 11. The slots 12 are dimensioned to accept AA batteries and include the necessary contact points 14 and 15. The battery chamber 11, battery slots 12, and charging circuit 13 are installed in a housing 16 having a pair of means for external power source connection. The female means for external power source connection 17 can be a BB-2590 charging connector that connects to the BB-2590 rechargeable lithium ion battery. The male means for external power source connection 18 can be a BA-8180 charging connector that connects to the BA-8180 zinc air battery. The power source connection means 17 and 18 are connected to the charging circuit 13, and allow the user the flexibility to connect to either type of battery for the recharging operation.

Figure 2:
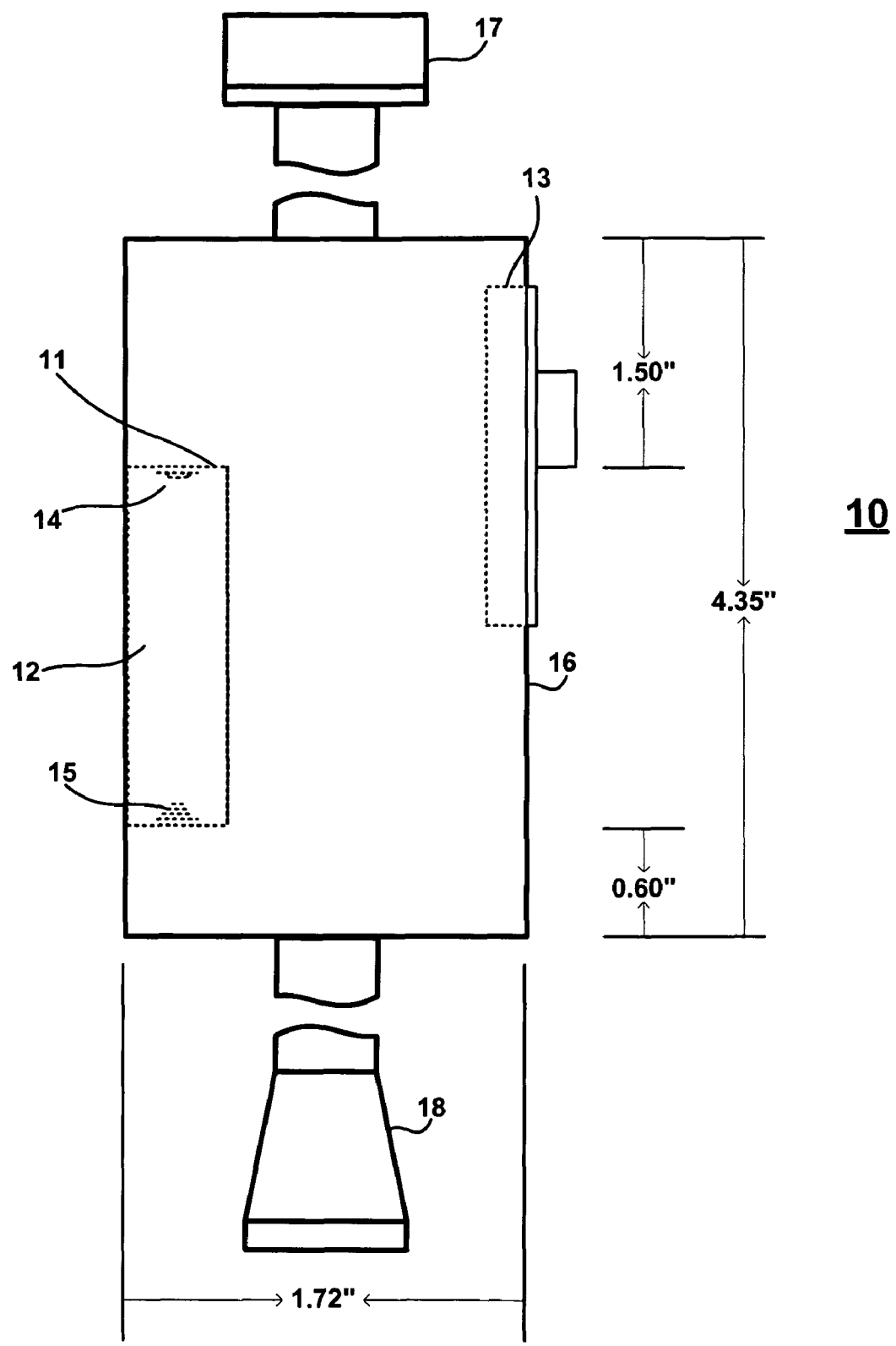
FIG. 2 is a breakaway side view of this invention's portable hybrid multi-input remote AA battery charger.

FIG. 2 is a breakaway side view of this invention's portable hybrid multi-input remote AA battery charger 10, using the same callout numerals, depicting the battery chamber 11, the battery slot 12, the charging circuit 13, contact points 14 and 15, the housing 16, the female power source connection means 17, and the male power source connection means 18. FIG. 2 also includes several representative dimensions such as the housing 16 being 1.72" deep and 4.35" long. Of course, numerous other dimensions are also possible in accordance with this invention.

Figure 3:
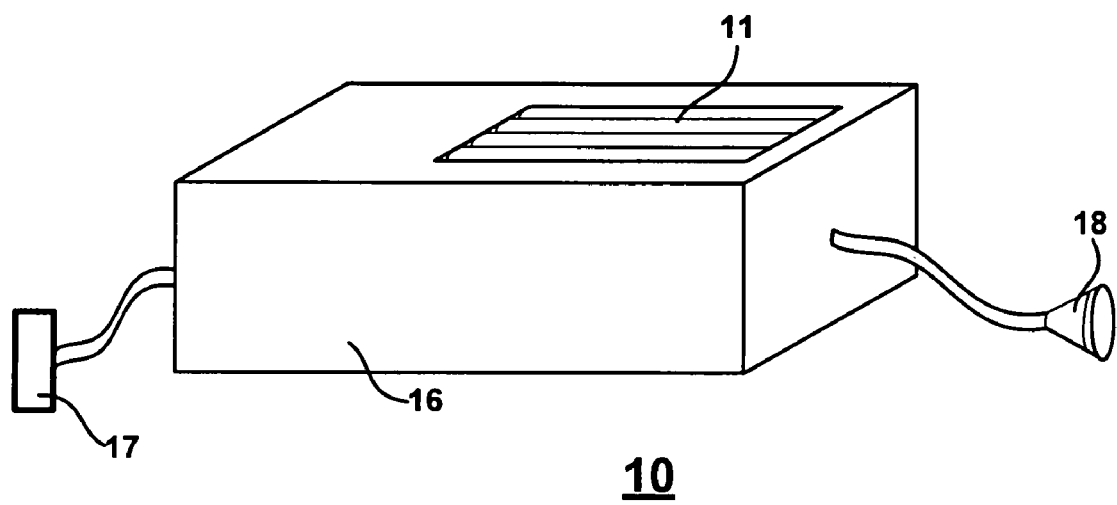
FIG. 3 is a perspective view this invention's portable hybrid multi-input remote AA battery charger with batteries loaded in the battery chamber.

FIG. 3 is a perspective of view this invention's portable hybrid multi-input remote AA battery charger 10 with four (4) AA batteries loaded in the battery chamber 11.

In operation, the present invention provides a portable 4-AA charging capability for the dismounted soldier or recreational camper in the field or in another remote location. The charger 10 includes a charging circuit 13 connected to the battery slot 12, all of which are enclosed in the housing 16. The charging circuit 13 can be a MAHA 100 minute charging circuit board, or another suitable charging circuit board. It is connected to the 4-AA battery chamber 11 that is positioned underneath the surface of the housing 16. The power source connection means 17 and 18 can be the BB-2590 and BA-8180 charging connectors, but other suitable connectors can also be advantageously employed.

Figure 4:
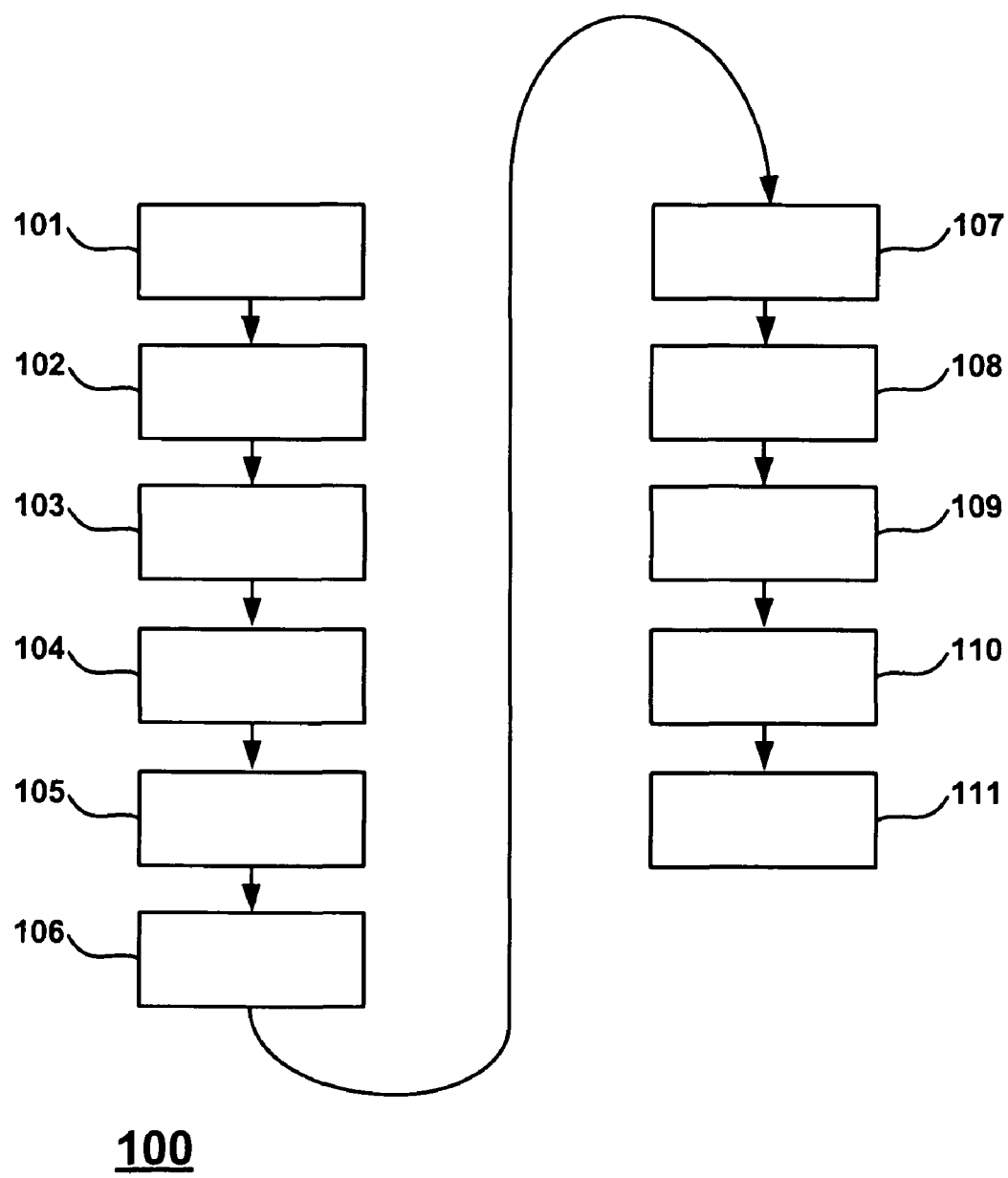
FIG. 4 is a flow diagram depicting the steps of this invention's method for charging AA rechargeable batteries with a portable hybrid multi-input remote battery charger.

Referring now to FIG. 4, this invention also encompasses a method for charging AA rechargeable batteries with a portable battery charger 100, comprising the steps of forming a housing 101; forming a battery chamber 102; disposing a plurality of battery slots within the battery chamber 103; dimensioning the plurality of battery slots to accept a plurality of AA rechargeable batteries 104; positioning a charging circuit underneath the battery chamber 105; connecting the charging circuit to the plurality of slots 106; and installing the battery chamber, the plurality of slots, and the charging circuit in a housing 107. The steps of the method continue with the steps of connecting a female means for external power source connection to the housing 108; connecting a male means for external power source connection to the housing 109; providing an electrical recharging input from the female and male power source connection means to the charging circuit 110; and rapidly recharging the plurality of AA rechargeable batteries 111. Many of the variations of the device and apparatus embodiments also apply to the method of this invention.

These embodiments of the present invention are intended to be illustrative and not limiting with respect to the variety of possible embodiments. It is to be further understood that other features and modifications to the foregoing detailed description of this invention's devices, apparatus, systems and methods are all considered to be within the contemplation of the present invention, which is not limited by this detailed description. Those skilled in the art will readily appreciate that any number of configurations of the present invention and numerous modifications and combinations of materials, components, geometrical arrangements and dimensions can achieve the results described herein, without departing from the spirit and scope of this invention. Accordingly, the present invention should not be limited by the foregoing description, but only by the appended claims.

What we claim is:

1. A portable hybrid multi-input remote AA battery charger, comprising:
    a battery chamber;
    a plurality of battery slots disposed within said battery chamber;
    a charging circuit positioned underneath said battery chamber;
    said plurality of battery slots being dimensioned to accept a plurality of AA rechargeable batteries;
    said charging circuit being connected to said plurality of slots;
    said battery chamber, said plurality of slots, and said charging circuit being installed in a housing;
    said housing having a female means for external power source connection and a male means for external power source connection; and
    said female and male external power source connection means provide an electrical recharging input to said charging circuit causing said plurality of AA rechargeable batteries to be rapidly recharged.

2. The portable hybrid multi-input remote AA battery charger, as recited in claim 1, further comprising recharging said plurality of AA rechargeable batteries within 100 minutes.

3. The portable hybrid multi-input remote AA battery charger, as recited in claim 2, further comprising said electrical charging input coming from a plurality of other batteries.

4. The portable hybrid multi-input remote AA battery charger, as recited in claim 3, further comprising said plurality of other batteries being a plurality of military batteries.

5. The portable hybrid multi-input remote AA battery charger, as recited in claim 4, further comprising said plurality of military batteries being selected from the group of military batteries consisting of the BA-8180, BA-8140, BA-5590, BA-5390, BB-390, BB-2590, and SP4 military batteries.

6. The portable hybrid multi-input remote AA battery charger, as recited in claim 5, further comprising said plurality of AA rechargeable batteries being rechargeable nickel metal hydride AA batteries.

7. A portable hybrid multi-input remote AA battery charging apparatus, comprising:
    a battery chamber;
    a plurality of battery slots disposed within said battery chamber;
    a charging circuit positioned underneath said battery chamber;

said plurality of battery slots being dimensioned to accept a plurality of AA rechargeable batteries;
said charging circuit being connected to said plurality of slots;
said battery chamber, said plurality of slots, and said charging circuit being installed in a housing;
said plurality of battery slots having a plurality of contact points;
said housing having a female means for external power source connection;
said housing having a male means for external power source connection; and
said female power source connection means and said male power source connection means provides an electrical recharging input from a plurality of other batteries to said charging circuit causing said plurality of AA rechargeable batteries to be rapidly recharged within 100 minutes.

8. The portable hybrid multi-input remote AA battery charging apparatus, as recited in claim 7, further comprising said battery chamber and said charging circuit being positioned adjacent to one another.

9. The portable hybrid multi-input remote AA battery charging apparatus, as recited in claim 8, further comprising said another battery selected from the group of military batteries consisting of the BA-8180, BA-8140, BA-5590, BA-5390, BB-390, BB-2590, and SP4 military batteries.

10. The portable hybrid multi-input remote AA battery charger, as recited in claim 9, further comprising said plurality of battery slots being dimensioned to accept four AA batteries.

11. The portable hybrid multi-input remote AA battery charging apparatus, as recited in claim 10, further comprising said plurality of AA rechargeable batteries being rechargeable nickel metal hydride AA batteries.

12. The portable hybrid multi-input remote AA battery charger, as recited in claim 11, further comprising said charging circuit being a MAHA charging circuit board.

13. A method for charging AA rechargeable batteries with a portable hybrid multi-input remote AA battery charger, comprising the steps of:
forming a housing;
forming a battery chamber;
disposing a plurality of battery slots within said battery chamber;
dimensioning said plurality of battery slots to accept a plurality of AA rechargeable batteries;
positioning a charging circuit underneath said battery chamber;
connecting said charging circuit to said plurality of slots;
installing said battery chamber, said plurality of slots, and said charging circuit in a housing;
connecting a female means for external power source connection to said housing;
connecting a male means for external power source connection to said housing;
providing an electrical recharging input from said female and male power source connection means to said charging circuit; and
rapidly recharging said plurality of AA rechargeable batteries.

14. The method for charging AA rechargeable batteries with the portable hybrid multi-input remote AA battery charger, as recited in claim 13, further comprising the step of rapidly recharging said plurality of AA rechargeable batteries within 100 minutes.

15. The method for charging AA rechargeable batteries with the portable hybrid multi-input remote AA battery charger, as recited in claim 14, further comprising the step of providing said electrical charging input from a plurality of other batteries.

16. The method for charging AA rechargeable batteries with the portable hybrid multi-input remote AA battery charger, as recited in claim 15, further comprising the step of selecting said plurality of other batteries from the group of military batteries consisting of the BA-8180, BA-8140, BA-5590, BA-5390, BB-390, BB-2590, and SP4 batteries.

17. The method for charging AA rechargeable batteries with the portable hybrid multi-input remote AA battery charger, as recited in claim 16, wherein said plurality of AA rechargeable batteries are a plurality of nickel metal hydride AA batteries.

* * * * *